United States Patent [19]
Takahashi et al.

[11] Patent Number: 5,894,831
[45] Date of Patent: Apr. 20, 1999

[54] ENGINE FUEL INJECTION SYSTEM

[75] Inventors: Masanori Takahashi; Hitoshi Watanabe, both of Hamamatsu, Japan

[73] Assignee: Sanshin Kogyo Kabushiki Kaisha, Japan

[21] Appl. No.: 08/837,272

[22] Filed: Apr. 11, 1997

[30] Foreign Application Priority Data

Apr. 12, 1996 [JP] Japan ................. 8-115530

[51] Int. Cl.⁶ ........................... F02M 55/02
[52] U.S. Cl. ..................... 123/470; 123/195 P
[58] Field of Search ................. 123/298, 301, 123/305, 470, 472, 73 C, 195 P, 590, 593

[56] References Cited

U.S. PATENT DOCUMENTS

| | | | |
|---|---|---|---|
| 4,327,675 | 5/1982 | Takeda | 123/470 |
| 4,378,001 | 3/1983 | Takeda et al. | 123/472 |
| 4,922,876 | 5/1990 | Mizoguchi et al. | 123/470 |
| 5,186,140 | 2/1993 | Ueda et al. | 123/308 |
| 5,398,654 | 3/1995 | Niebrzydoski | 123/73 C |
| 5,476,082 | 12/1995 | Carpenter et al. | 123/472 |
| 5,577,477 | 11/1996 | Katoh | 123/472 |
| 5,630,390 | 5/1997 | Tsunoda et al. | 123/195 P |
| 5,683,277 | 11/1997 | Tsunoda et al. | 123/195 P |

FOREIGN PATENT DOCUMENTS 405141253 6/1993 Japan ................. 123/195 P

*Primary Examiner*—Thomas N. Moulis
*Attorney, Agent, or Firm*—Knobbe, Martens, Olson & Bear

[57] ABSTRACT

A fuel injection system for an internal combustion engine of the type utilized to power an outboard motor of a watercraft is disclosed. The engine is oriented with its crankshaft vertically extending, such that the engine has a top and a bottom, a first end and a second end, and a side between the ends. An air delivery passage extends generally from the first end along said side to an intake passage leading through the engine to a combustion chamber therein. A fuel injector is positioned along the side of the engine and arranged to deliver fuel into air flowing through the passage. In one arrangement, the fuel injector is connected to an intake manifold defining at least a part of the air delivery passage and is adapted to deliver fuel opposite the flow of air through the passage at the point of delivery. In a second embodiment, the fuel injector is positioned between the air delivery passage and the side of the engine. In this embodiment, the fuel injector is preferably arranged to deliver fuel perpendicular to the flow of air through the passage.

16 Claims, 7 Drawing Sheets

5,894,831

ENGINE FUEL INJECTION SYSTEM

FIELD OF THE INVENTION

The present invention relates to a fuel injection system for an internal combustion engine.

BACKGROUND OF THE INVENTION

Watercraft are often powered by outboard motors positioned at the stern of the craft. These motors have an internal combustion engine positioned within a cowling of the motor. For among other reasons, because the outboard motor is positioned at the stern of the craft, and because the motor is tiltable, it is desirable to keep the engine's size and weight to a minimum.

These engines are oriented within the cowling such that the crankshaft of the engine is vertically extending. In this arrangement, a cylinder head is positioned at one end of the engine and a crankcase chamber at the other. The combustion chambers are arranged vertically, and the cylinder head has a top end and a bottom end.

Fuel is supplied to the combustion chambers of many of these engines with fuel injectors. These engines typically have the fuel injectors positioned to spray fuel directly into the combustion chamber or into air flowing past the injector through a passage leading to the combustion chambers.

In order to arrange the fuel injectors as described above, the fuel injectors are spaced vertically along the cylinder head from its top to bottom end for projection into the combustion chambers or corresponding adjacent intake passage through the cylinder head. A fuel rail extends along the outside of the cylinder head at that end of the engine for supplying fuel to the fuel injectors. This arrangement causes the total engine profile to be increased, forcing the entire outboard motor to be larger.

On the other hand, if the injectors are tilted or the like, the risk exists that while the profile of the engine may be reduced, the injectors may not spray fuel into the air charge in a manner which promotes optimum mixing for combustion.

A fuel injection system for an engine where the injection system does not undesirably increase the profile of the engine and where the fuel injectors deliver fuel into the air in a manner which promotes mixing of the same, is desirable.

SUMMARY OF THE INVENTION

In accordance with the present invention, there is provided a fuel injection system for an internal combustion engine. The engine is preferably of the type utilized to power an outboard motor of a watercraft. The engine is oriented so that a crankshaft thereof is vertically extending, such that the engine has a top, a bottom, first end, a second end and opposing sides between the first and second ends.

An air inlet is positioned generally at a first end of the engine, and an air passage extends from the inlet along a first side of the engine to an intake passage extending through the engine to a combustion chamber therein. Preferably, the air passage is defined by an elongate runner extending between the inlet and an intake manifold connected to the side of the engine.

The fuel injector system includes a fuel injector positioned along the side of the engine and arranged to deliver fuel to air passing through the air passage to the combustion chamber.

In a first arrangement, the fuel injector is arranged to deliver fuel in a direction which is opposite the flow of air at the point of delivery. In this arrangement, the fuel injector is preferably mounted to the manifold and directs fuel inwardly towards the passage extending through the runner.

In a second arrangement, the fuel injector is arranged to deliver fuel in a direction perpendicular to the flow of air at the delivery point. In this arrangement, the injector is also preferably mounted to the manifold, and is positioned between the runner and the side of the engine. Preferably, a diverter is centered in the passage through the manifold and the injector is arranged to spray fuel against the diverter.

In the embodiments of the present invention, the fuel system, including the fuel injector, is arranged to prevent an increase in the profile of the engine at its ends. At the same time, the injector is arranged to deliver fuel to the incoming air in a manner which promotes mixing of the air and fuel for combustion.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In accordance with the present invention, there is provided an outboard motor 20 powered by an engine 22 having a fuel injection system in accordance with the present invention.

Figure 1:
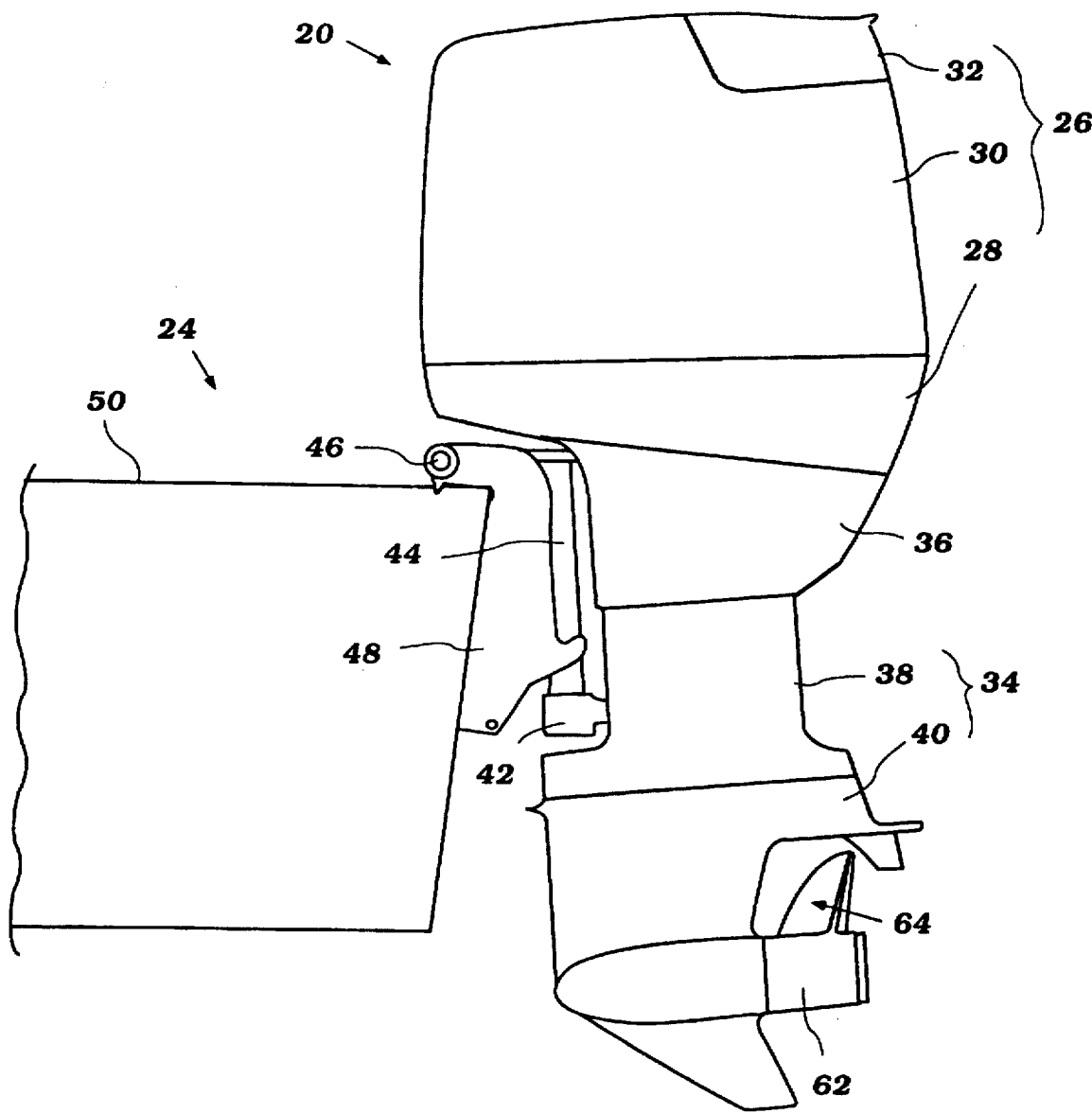
FIG. 1 is a side view of an outboard motor of the type powered by an internal combustion engine having the fuel injection system in accordance with the present invention.

As best illustrated in FIG. 1, the outboard motor 20 is utilized to power a watercraft 24. The outboard motor 20 has a powerhead area 26 comprised of a lower tray portion 28 and a main cowling portion 30. An air inlet or vent area 32 is provided in the main cowling portion 30 for providing air to an engine 22 therein, and for exhausting heated air from within the cowling 30, as described in more detail below.

The motor 20 includes a lower unit 34 extending downwardly therefrom, with an apron 36 providing a transition between the powerhead 26 and the lower unit 34. The lower unit 34 comprises an upper or "drive shaft housing" section 38 and a lower section 40.

A steering shaft, not shown, is affixed to the lower section 40 of the lower unit 34 by means of a bracket 42. The steering shaft is supported for steering movement about a vertically extending axis within a swivel bracket 44. The swivel bracket 44 is connected by means of a pivot pin 46 to a clamping bracket 48 which is attached to a transom portion of a hull 50 of the watercraft. The pivot pin 46 permits the outboard motor 20 to be trimmed and tilted up about the horizontally disposed axis formed by the pivot pin 46.

Figure 2:
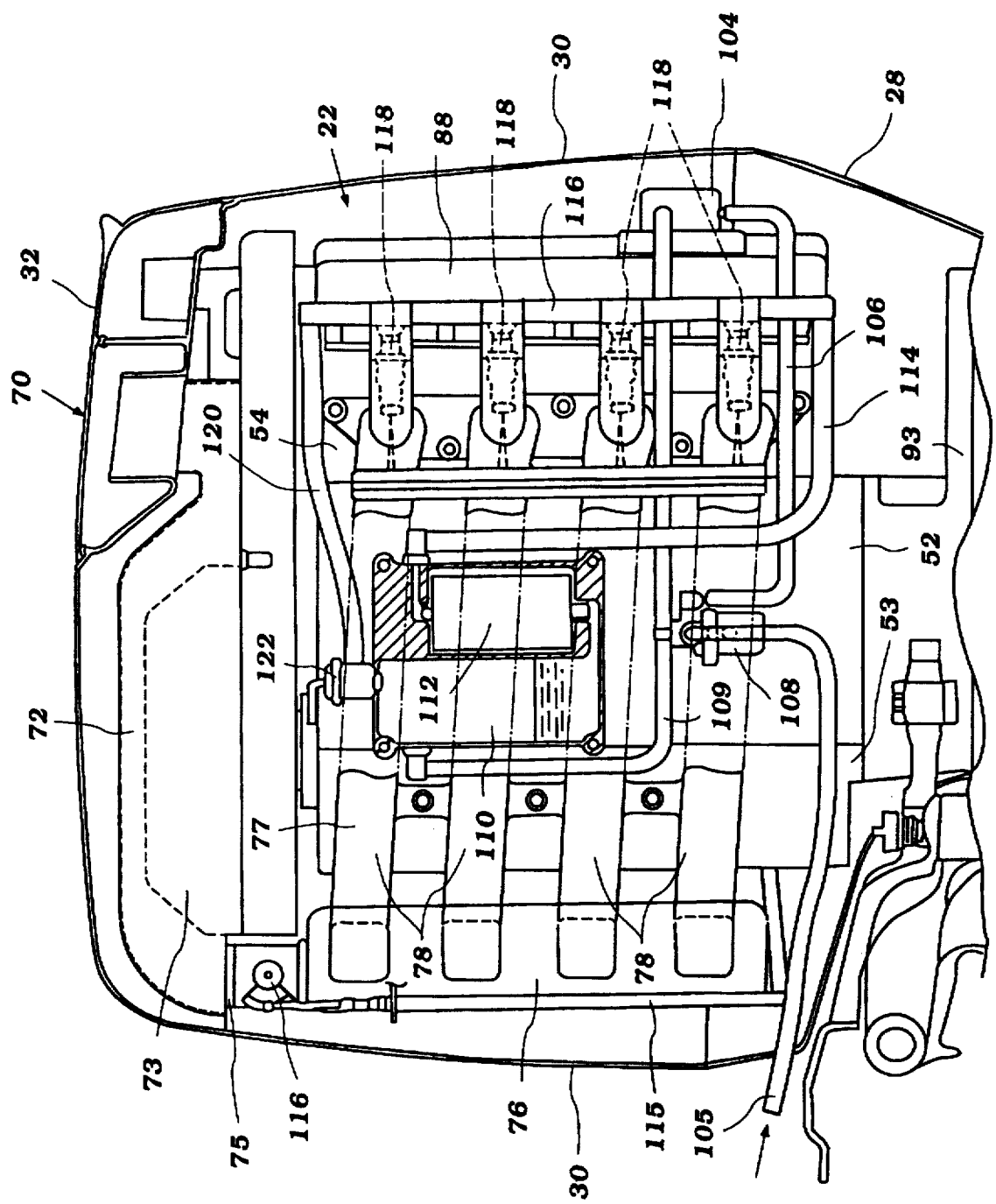
FIG. 2 is a cross-sectional side view of a top portion of the motor illustrated in FIG. 1, exposing the engine therein, portions of which are illustrated in cross-section, the engine having a fuel injection system in accordance with a first embodiment of the present invention.

As best illustrated in FIG. 2, the power head 26 of the outboard motor 20 includes the engine 22 which is positioned within the cowling portion 30. The engine 22 is preferably of the inline, four-cylinder, four-cycle variety, and thus includes a cylinder block 52 which has a cylinder bank closed by a cylinder head assembly 54 in a manner which will be described. As also illustrated in FIG. 2, the engine 22 is preferably oriented within the cowling 30 such that its cylinder head 54 is positioned on the block 52 on the end opposite the watercraft's transom. So oriented, the engine 22 has a top, a bottom, a first end (where the cylinder head 54 is positioned, facing away from the watercraft 24) a second end (where the crankcase 57 is positioned, facing the watercraft 24), and two opposing sides between the ends.

A crankshaft 56 is rotatably journalled in a crankcase chamber 57 formed by the cylinder block 52 a crankcase cover 53. As is typical with outboard motor practice, the engine 22 is mounted in the power head 26 so that the crankshaft 56 rotates about a vertically extending axis. This facilitates coupling to a drive shaft (not shown) which depends into the lower unit 34, wherein it drives a bevel gear and a conventional forward-neutral-reverse transmission. The transmission is not illustrated herein, because its construction per se forms no part of the invention. Therefore, any known type of transmission may be employed. A control is preferably provided for allowing an operator to remotely control the transmission from the watercraft 24.

The transmission drives a propeller shaft which is journalled within the lower section 40 of the lower unit 34 in a known manner. A hub 62 of a propeller 64 is coupled to the propeller shaft for providing a propulsive force to the watercraft 24 in a manner well known in this art.

Figure 3:
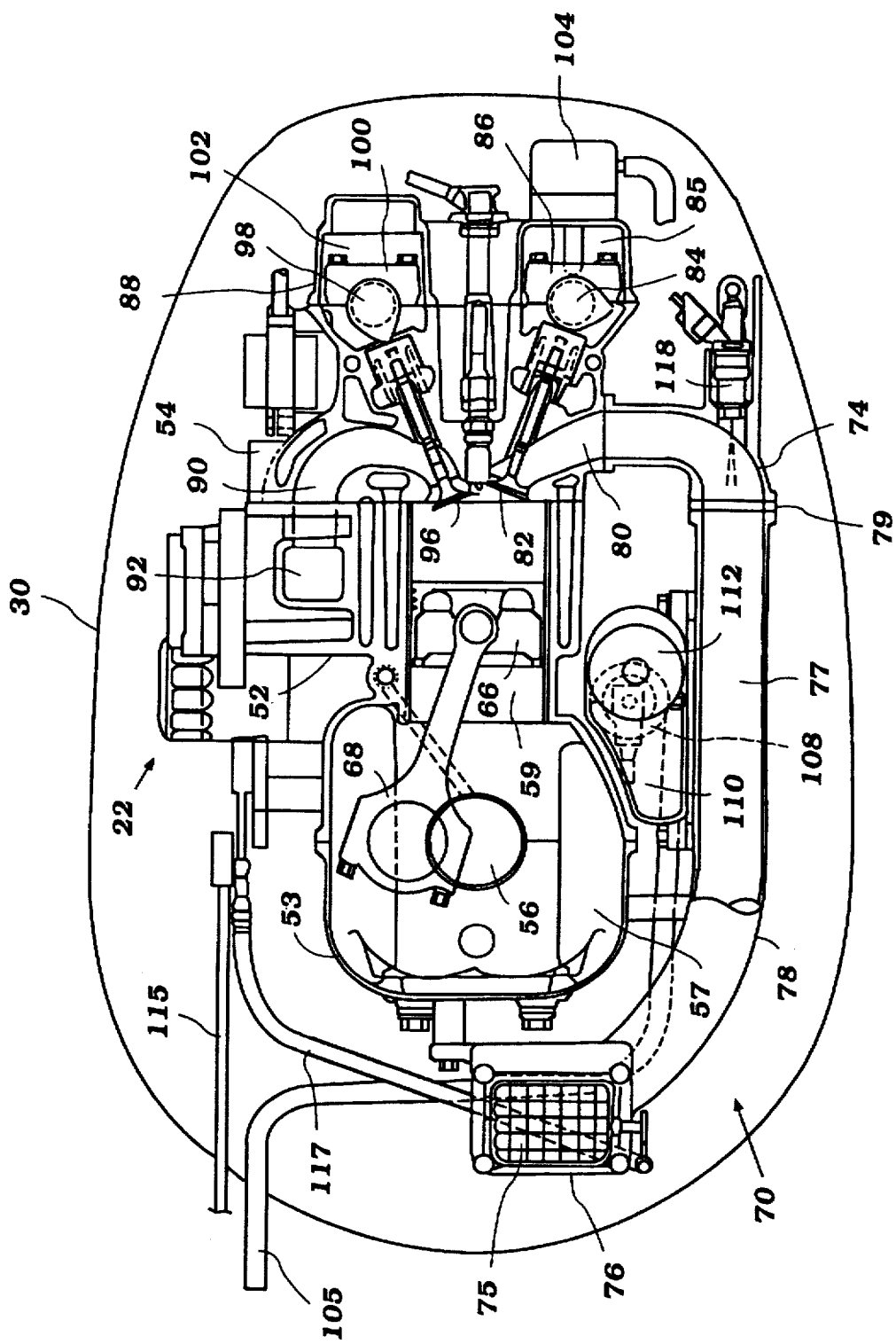
FIG. 3 is a cross-sectional top view of the motor and engine illustrated in FIG. 2.

The construction of the engine 22 and the fuel injection arrangement of the present invention will now be described in more detail. As illustrated in FIG. 3, the engine 22 has a number of variable volume combustion chambers 59, preferably totaling four in number, arranged in inline fashion. It should be understood that there may be as few as one combustion chamber, or more than four.

Each combustion chamber has a piston 66 mounted therein for reciprocation, the piston connected to the crankshaft 56 via a connecting rod 68. The cylinder head 54 is preferably connected to the cylinder block 52 via a number of bolts, as is known in the art.

Referring to in FIGS. 2 and 3, an intake system 70 provides air to each combustion chamber. Air is routed from the vent portion 32 through a passage 72 to a surge tank 76 positioned at the second end of the engine 22. The passage 72 is preferably defined in part by a camshaft drive cover 73 which extends over the top end of the engine 22.

More particularly, air is routed from the passage 72 through an intake 75 of the surge tank 76. Air is then routed from the surge tank 76 through passages 77 formed in runners 78 to passages extending through an intake manifold 74. Preferably, a gasket 79 is positioned between the connected runners 78 and manifold 74. The runners 78 extend from the second end of the engine along a side of the engine 22 to the manifold 74 which is positioned along the side of the engine 22 via connection to the cylinder head 54.

The manifold 74 has a number of passages extending therethrough equal to the number of runners 78. Each passage through the manifold 74 leads to a corresponding passage 80 positioned within the cylinder head 54 leading to the combustion chamber 59. An inlet passage 80 is provided corresponding to each combustion chamber 59. As illustrated, the manifold 74 is arranged so that the passages therein bend or curve towards the engine 22 from the passage 77 in the runner. The total bend is approximately 90° in the embodiment illustrated, as the inlet passages 80 extend through the side of the cylinder head 54.

Means are provided for controlling the passage of air through each inlet passage 80 to its respective combustion chamber 59. Preferably, this means comprises an intake valve 82. As illustrated, all of the intake valves 82 are preferably actuated by an intake camshaft 84. The intake camshaft 84 is mounted for rotation with respect to the head 54 and connected thereto with at least one bracket 86. The camshaft 84 is positioned in a chamber 85 formed by a cover 88 which is connected to the head 54.

An exhaust system is provided for routing the products of combustion within the combustion chambers 59 to a point external to the engine 22. In particular, an exhaust passage 90 leads from each combustion chamber to a passage 92 in an exhaust manifold portion 94 of the engine 22. The passage 92 leads through an exhaust guide 93 to an exhaust chamber and outlet in the lower unit 34, as is well known to those skilled in the art.

Means are also provided for controlling the flow of exhaust from each combustion chamber 59 to its respective exhaust passage 92. Preferably, this means comprises an exhaust valve 96. Like the intake valves 82, the exhaust valves 96 are preferably all actuated by an exhaust camshaft 98. The exhaust camshaft 98 is journalled for rotation with respect to the cylinder head 54 and connected thereto with at least one bracket 100. The exhaust camshaft 98 is positioned within a chamber 102 formed by the cover 88.

Though not illustrated, means are provided for driving the camshafts 84,98. A variety of drive arrangements may be provided, as known to those skilled in the art. One such arrangement is that which includes a timing belt pulley mounted on a top end of the crankshaft 56 positioned outside of the cylinder block 52, and just below a flywheel (not shown) also positioned on the crankshaft 56. An exhaust camshaft pulley is mounted on an end of the exhaust camshaft extending from the top end of the engine 22, and an intake camshaft pulley is mounted on an end of the intake camshaft 84 extending from the top end of the engine. A drive belt extends around the timing belt pulley and the exhaust and intake camshaft pulleys, whereby the camshaft 56 indirectly drives the camshafts. One or more tensioner pulleys may be provided for maintaining the belt in a taunt condition.

A throttle 116 is provided for controlling the flow of air into each combustion chamber 59. Preferably, the throttle 116 comprises a moveable plate positioned within the intake 75. The throttle 116 is preferably controlled by a cable 117 which is connected to a throttle control 115 in the form of a cable extending from a control area of the watercraft 24, whereby the operator of the watercraft may control the throttle remotely therefrom.

A suitable ignition system is provided for igniting an air and fuel (the fuel being provided with the fuel system described in detail below) mixture within each combustion chamber 59. Such systems are well known to those skilled in the art, and as such forms no portion of the invention herein, such is not described in detail here.

The engine 22 includes a lubricating system for providing lubricant to the various portions of the engine. The lubricating system is not described in detail here, and may be of a variety of types found suitable to those skilled in the art.

The engine 22 also preferably includes a liquid cooling system. As the cooling system does not comprise a portion of the present invention, it is not described in detail herein. As is known to those skilled in the art, however, the cooling system generally includes a pump for drawing cooling water from the body of water in which the motor 20 is operating, and distributing it throughout coolant passages in the engine 22. In addition, the cooling system may include one or more exhaust system cooling jackets for cooling the exhaust system.

A fuel delivery system is provided for delivering fuel to each combustion chamber 59 for combustion therein. The fuel delivery system preferably includes a fuel tank (not shown) which is normally positioned within the watercraft 24. Fuel is drawn from the fuel tank by a fuel pump 104 through a supply line 105. The supply line 105 extends to a fuel filter 108 which is preferably mounted on a side of the engine 22.

Fuel passing through the filter 108 passes through a fuel line 106 to the pump 104. As illustrated in FIGS. 2 and 3, the fuel pump 104 is positioned on the cover 88 at the end of the engine 22 opposite the watercraft 24.

Fuel is supplied by the pump 104 to a chamber of a vapor separator 110 through a delivery line 109. Fuel is drawn from the chamber of the separator by a high pressure pump 112. Fuel under high pressure is delivered by the pump 112 through a high pressure fuel line 114 to a fuel rail 116. As illustrated and described in more detail below, the fuel rail 116 extends along a side of the engine 22. Fuel is delivered by the rail 116 to a fuel injector 118 corresponding to each combustion chamber 59. Any fuel which is supplied to the rail 116 but which is not delivered by the injectors 118 is routed through a return line 120 through a pressure regulator 122 back into the chamber of the vapor separator 110 for pumping fuel from the tank and delivering it to each combustion chamber 59;.

Figure 4:
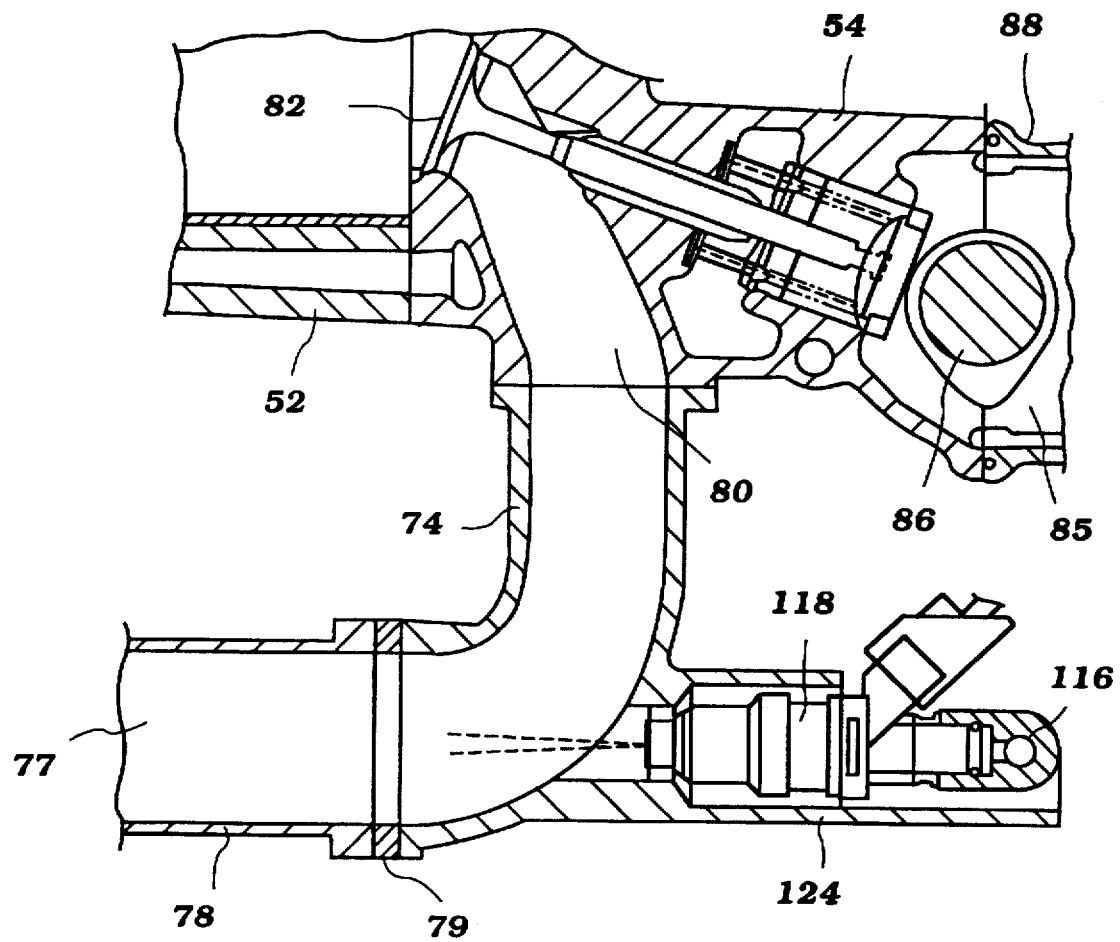
FIG. 4 is an enlarged cross-sectional view of a air intake and fuel injector arrangement of the engine illustrated in FIG. 2.
Figure 5:
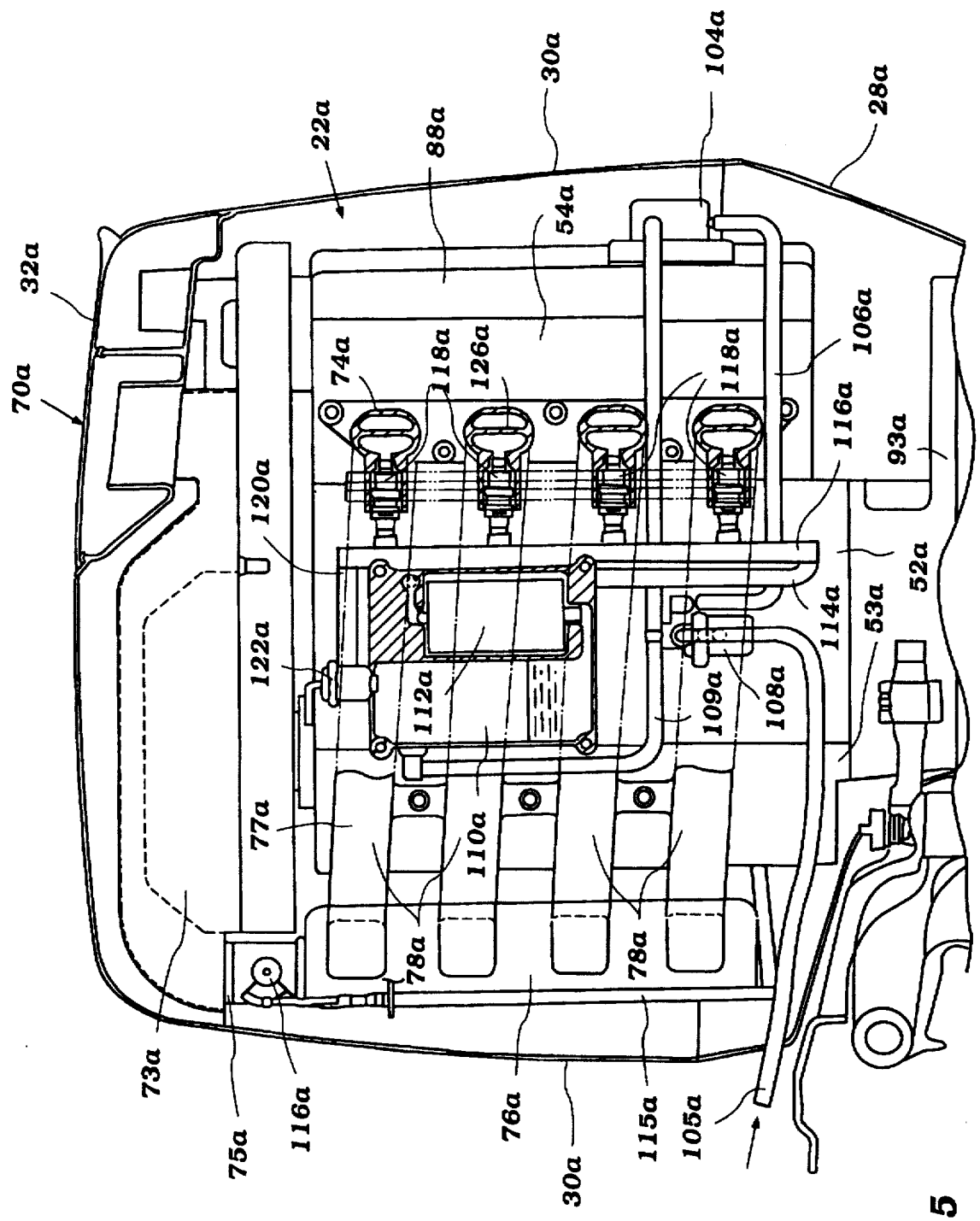
FIG. 5 is a cross-sectional side view of a top portion of the motor illustrated in FIG. 1, exposing the engine therein, portions of which are illustrated in cross-section, the engine having a fuel injection system in accordance with a second embodiment of the present invention.
Figure 6:
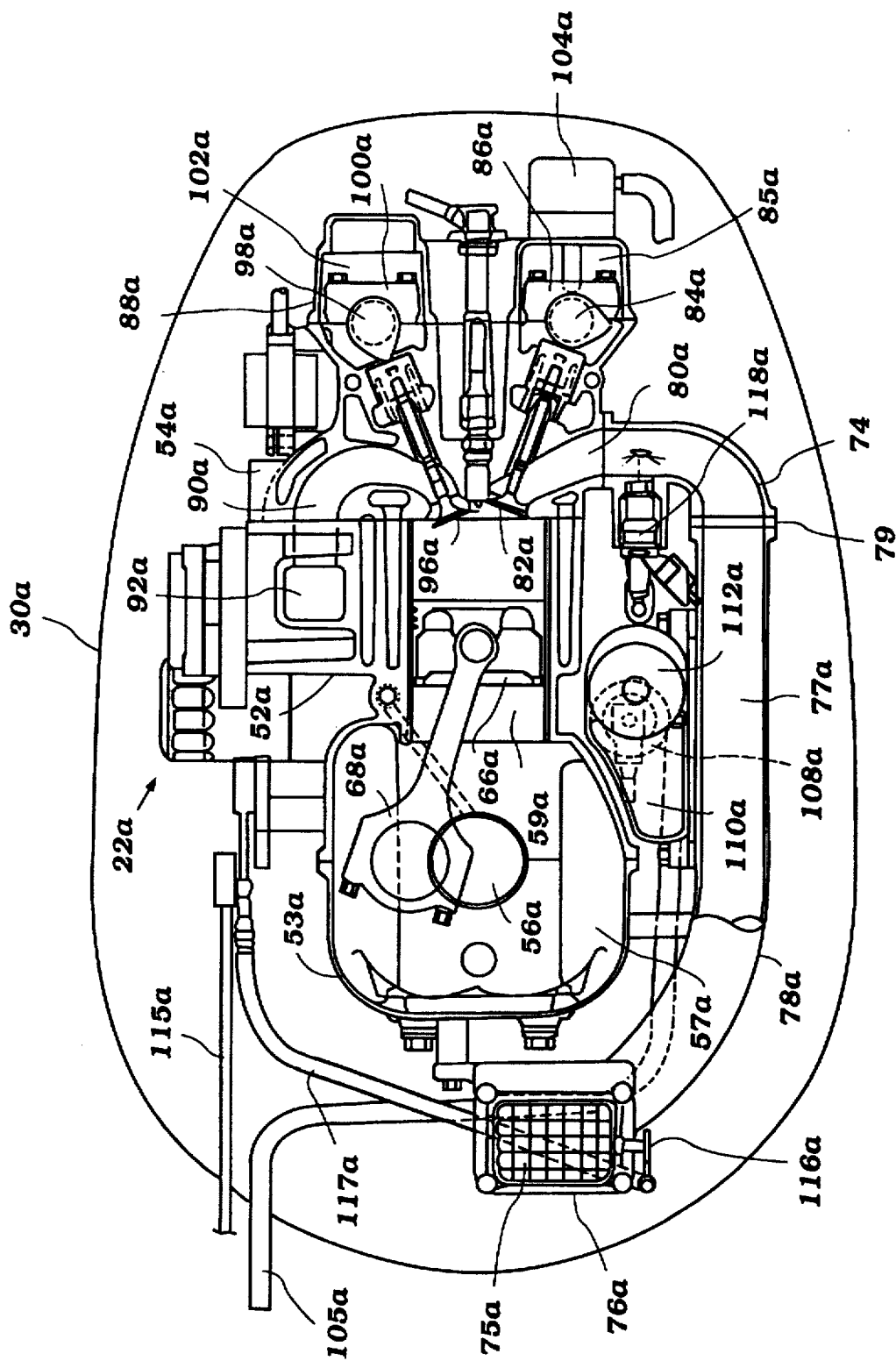
FIG. 6 is a cross-sectional top view of the motor and engine illustrated in FIG. 5.

As illustrated in FIG. 4, each fuel injector 118 is positioned along the side of the engine. In the embodiment illustrated in FIG. 3, each fuel injector 118 is mounted to the intake manifold 74 by a boss member 124 extending therefrom. Most preferably, each injector 118 is oriented so that it sprays fuel in a direction which is generally opposite the direction of air flow of the air flowing through the passage 77 of the runner 78 at the intersection of the runner 78 and manifold 74 at the point of fuel delivery.

This arrangement has the benefit that the fuel injectors 118 and fuel rail 116 are positioned along the side of the engine 22 and do not contribute to an increase in engine profile between the front and rear ends, as is the case when the fuel rail 116 extends along the cover 88 at the end of the engine. In addition, this orientation results in atomization of the fuel and mixing of the fuel and air.

Of course, the injectors 118 could be similarly positioned but mounted to the cylinder head 54 or cylinder block 52.

FIGS. 5–8 illustrate an alternate embodiment fuel injection system in accordance with the present invention. In the description and figures of this embodiment system, like numerals have been used with like parts to those described and illustrated above, except that an "a" designator has been added thereto.

In this embodiment, the bosses 124a to which the fuel injectors 118a are mounted extend from the exhaust manifold 74a into the space between the runners 78a and the side of the engine 22a along the cylinder block 52a thereof. Most preferably, the injectors 118a are oriented to direct fuel into a passage through the intake manifold 74a corresponding to one of the combustion chambers 59a.

Figure 7:
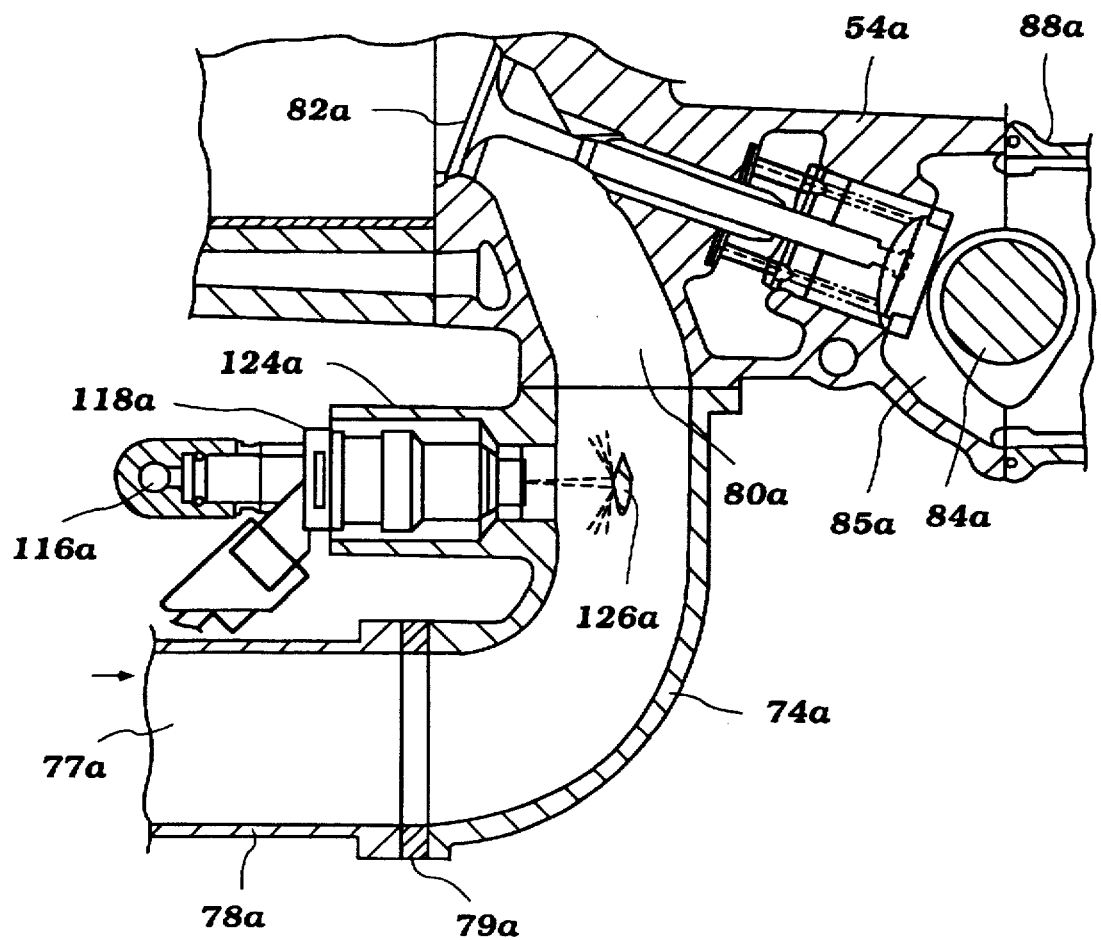
FIG. 7 is a an enlarged cross-sectional view of a air intake and fuel injector arrangement of the engine illustrated in FIG. 5.

So mounted, the injectors 118a spray fuel into the passages in the manifold 74a generally perpendicular to the passages and to air flowing therethrough. A deflector 126a is preferably centered within each passage through the manifold 74a. As illustrated in FIG. 7, the deflector 126a is diamond-shaped (in cross-section), having a length (i.e. parallel to the direction of air flow) which is greater than its width, and being first narrow, then increasing in width, and then decreasing in width, moving the along the length of the deflector from one end to the other. This arrangement allows the deflector 126a to have an aerodynamic profile reducing interference with the flow of air through the passage. At the same time, the deflector 126a has sufficient width to deflect the majority of the fuel which is directed into the passage by the fuel injector 118a.

Figure 8:
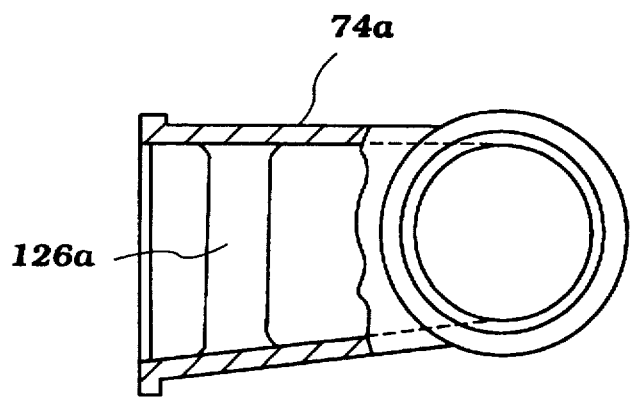
FIG. 8 is a partial cross-sectional view of an intake manifold of the engine illustrated in FIG. 5.

As illustrated in FIG. 8, the deflector 126a preferably extends from a top of the passage to the bottom of the passage in a vertical direction. The deflector 126a is connected to the manifold 74a.

The fuel supply system (i.e. the pumps 104a, 112a, pressure regulator 110a, etc.) is generally similar to that described in the last embodiment with fuel line lengths and positions changing to accommodate the new injector 118a positioning. This embodiment fuel injector arrangement also has the advantage that the injectors 118e and fuel rail 116a are positioned along the side of the engine 22 thereby not contributing to an increase in the profile of the engine 22 at its ends. Also, the injection 118a arrangement serves to adequately mix the fuel and air.

Of course, the foregoing description is that of preferred embodiments of the invention, and various changes and modifications may be made without departing from the spirit and scope of the invention, as defined by the appended claims.

What is claimed is:

1. A fuel injection system for an internal combustion engine of the type utilized to power an outboard motor of a watercraft, the engine having a vertically extending crankshaft, at least one combustion chamber, a first end and a second end and a side therebetween, an intake passage extending along said side of said engine to a delivery passage through said engine to said combustion chamber, said fuel injection system comprising a fuel injector positioned along said side of said engine and arranged to deliver fuel to air flowing through said intake passage in a direction opposite the flow of air through said passage at said point of delivery.

2. The fuel injection system in accordance with claim 1, wherein said intake passage is defined by a runner extending from said first end of said engine towards said second end of said engine to an intake manifold, and said injector is mounted to said manifold.

3. The fuel injection system in accordance with claim 2, wherein said injector is positioned between said runner and said side of said engine.

4. The fuel injection system in accordance with claim 2, wherein said injector is oriented to deliver fuel in a direction of said passage through said runner.

5. The fuel injection system in accordance with claim 1, further including means for delivering fuel to said fuel injector.

6. A fuel injection system for an internal combustion engine of the type utilized to power an outboard motor of a watercraft, the engine having a vertically extending crankshaft, at least one combustion chamber, a first end and a second end and a side therebetween, an intake passage extending along said side of said engine to a deliver passage through said engine to said combustion chamber, said fuel injection system comprising a fuel injector positioned along said side of said engine and arranged to deliver fuel in a direction perpendicular to air flowing through said intake passage, and wherein a diverter member is positioned in said passage and said fuel injector is arranged to deliver said fuel towards said diverter member.

7. The fuel injection system in accordance with claim 6, wherein said diverter is centered in said passage.

8. The fuel injection system in accordance with claim 6, wherein said diverter is diamond-shape in cross-sectional profile.

9. The fuel injection system in accordance with claim 6, wherein said diverter has a profile parallel to said direction of said flow of air which is greater than a profile perpendicular to said direction of said flow of air.

10. An internal combustion engine, said engine comprising a cylinder block having a cylinder head connected thereto and cooperating therewith to define at least one combustion chamber therein, said engine having a top, a bottom, a first end, a second end where said cylinder head is located, and opposing first and second sides between said ends, an air inlet positioned generally at said first end of said engine, an air passage extending from said air inlet along said first side of said engine to an intake passage extending through a side of said cylinder head and therethrough to said combustion chamber, a fuel injector mounted to said intake manifold and positioned along said first side of said engine and arranged to deliver fuel in a direction opposite the flow of said air passing through said air passage, and means for delivering fuel to said fuel injector.

11. The engine in accordance with claim 10, wherein said air passage comprises a first passage extending through a runner and a second passage extending through an intake manifold, the intake manifold connected to said cylinder head and said runner extending between said air inlet and said intake manifold, whereby air passes through said inlet to said first passage, then said second passage, then through said intake passage to said combustion chamber.

12. The engine in accordance with claim 10, wherein said fuel injector is arranged to deliver said fuel in the direction of said passage through said runner.

13. An internal combustion engine, said engine comprising a cylinder block having a cylinder head connected thereto and cooperating therewith to define at least one combustion chamber therein, said engine having a top, a bottom, a first end, a second end where said cylinder head is located, and opposing first and second sides between said ends, an air inlet positioned generally at said first end of said engine, an air passage extending from said air inlet along said first side of said engine to an intake passage extending through a side of said cylinder head and therethrough to said combustion chamber, a fuel injector positioned along said first side of said engine and arranged to deliver fuel generally perpendicular to the flow of said air passing through said air passage, means for delivering fuel to said fuel injector, and wherein a diverter is positioned in said second passage and said fuel injector is arranged to deliver said fuel towards said diverter.

14. The engine in accordance with claim 13, wherein said diverter is centered in said passage.

15. The engine in accordance with claim 13, wherein said diverter is diamond-shaped in cross-sectional profile.

16. The engine in accordance with claim 10, wherein said fuel injector is positioned between said air delivery passage and said side of said engine.

* * * * *